(12) United States Patent
Dodds et al.

(10) Patent No.: US 6,642,446 B2
(45) Date of Patent: Nov. 4, 2003

(54) ENCLOSURE

(75) Inventors: J. Joseph Dodds, Westmoreland County, PA (US); Gerald Stephani, Waukesha County, WI (US)

(73) Assignee: Robroy Industries, Inc., Verona, PA (US)

( * ) Notice: Subject to any disclaimer, the term of this patent is extended or adjusted under 35 U.S.C. 154(b) by 0 days.

(21) Appl. No.: 10/157,350

(22) Filed: May 28, 2002

(65) Prior Publication Data

US 2002/0139555 A1 Oct. 3, 2002

Related U.S. Application Data

(62) Division of application No. 09/713,568, filed on Nov. 16, 2000.

(51) Int. Cl.$^7$ ................................................ H02G 3/08
(52) U.S. Cl. ............................. 174/50; 174/54; 220/32; 220/3.8; 220/4.02; 292/247; 292/DIG. 11
(58) Field of Search ................................. 174/50, 17 R, 174/54, 53, 66, 67; 220/3.2, 3.3, 3.94, 241, 3.5, 3.6, 3.7, 3.8, 4.01, 4.02; 292/247, DIG. 53, 258, 113, 257, 246, DIG. 60, DIG. 11

(56) References Cited

U.S. PATENT DOCUMENTS

| | | | |
|---|---|---|---|
| 93,058 A | 7/1869 | Cole | |
| 1,052,701 A | 2/1913 | Watters | |
| 1,469,196 A | 9/1923 | Strange | |
| 2,057,269 A | 10/1936 | Schreiber | 16/176 |
| 2,277,379 A | 3/1942 | Wilson | 292/246 |
| 2,485,012 A | 10/1949 | Palmer et al. | 292/228 |
| 3,129,025 A | 4/1964 | Krueger | 292/97 |
| 3,146,011 A | 8/1964 | Seevers | 292/247 |
| 3,193,314 A | 7/1965 | Johnson | 292/113 |
| 3,490,805 A | 1/1970 | Di Pierro et al. | 292/258 |

(List continued on next page.)

*Primary Examiner*—Dean A. Reichard
*Assistant Examiner*—Angel R. Estrada
(74) *Attorney, Agent, or Firm*—Webb Ziesenheim Logsdon Orkin & Hanson P.C.

(57) ABSTRACT

An enclosure for electrical components including a box with a hinged door or fastener attached cover and an interchangeable component management system and an interchangeable fastening system. The component management system includes a support member releasably fixed to an interior wall of the box and a mounting bracket positionable at locations along the support member. The interchangeable fastening system mounts on a raised portion on the exterior of the box.

6 Claims, 7 Drawing Sheets

U.S. PATENT DOCUMENTS

| | | | | |
|---|---|---|---|---|
| 3,584,912 A | | 6/1971 | Leger | 296/117 |
| 3,730,576 A | | 5/1973 | Schurman | 292/246 |
| 4,127,305 A | | 11/1978 | Nielsen | 301/36 R |
| 4,213,643 A | | 7/1980 | Blind et al. | 292/247 |
| 4,342,136 A | | 8/1982 | Okabe et al. | 16/115 |
| 4,475,266 A | | 10/1984 | Suska | 16/273 |
| 4,512,598 A | | 4/1985 | Coller | 292/263 |
| 4,524,486 A | | 6/1985 | Rios et al. | 16/381 |
| 4,603,452 A | | 8/1986 | Paciorek | 16/262 |
| 4,617,699 A | | 10/1986 | Nakamura | 16/262 |
| 4,631,937 A | | 12/1986 | Debus et al. | 70/207 |
| 4,735,151 A | * | 4/1988 | Bisbing | 108/69 |
| 4,779,828 A | | 10/1988 | Munch | 248/74.3 |
| 4,915,913 A | | 4/1990 | Williams et al. | 422/119 |
| 4,917,421 A | | 4/1990 | Wightman et al. | 292/247 |
| 4,987,639 A | | 1/1991 | Baiuley et al. | 16/126 |
| 5,084,596 A | | 1/1992 | Borsh et al. | 174/53 |
| 5,148,348 A | * | 9/1992 | White | 361/658 |
| 5,201,557 A | * | 4/1993 | Schlack | 292/161 |
| 5,259,091 A | | 11/1993 | Mordick | 16/262 |
| 5,271,649 A | * | 12/1993 | Gromotka | 292/113 |
| 5,375,894 A | * | 12/1994 | Schlack | 292/36 |
| 5,478,125 A | * | 12/1995 | Gromotka | 292/67 |
| 5,577,295 A | | 11/1996 | Papke et al. | 16/254 |
| 5,603,535 A | * | 2/1997 | Antonucci et al. | 292/128 |
| 5,626,373 A | * | 5/1997 | Chambers et al. | 292/113 |
| 5,669,638 A | * | 9/1997 | Anderson et al. | 292/111 |
| 6,179,144 B1 | * | 1/2001 | Abroy et al. | 220/3.8 |
| 6,179,350 B1 | * | 1/2001 | Ely et al. | 292/113 |
| 6,184,468 B1 | * | 2/2001 | Speziale | 174/66 |
| 6,203,076 B1 | * | 3/2001 | Wytcherley et al. | 292/202 |
| 6,369,321 B1 | * | 4/2002 | Flegel | 174/50 |
| 6,378,918 B1 | * | 4/2002 | Mita et al. | 292/103 |
| 6,469,247 B1 | * | 10/2002 | Dodds et al. | 174/50 |

\* cited by examiner

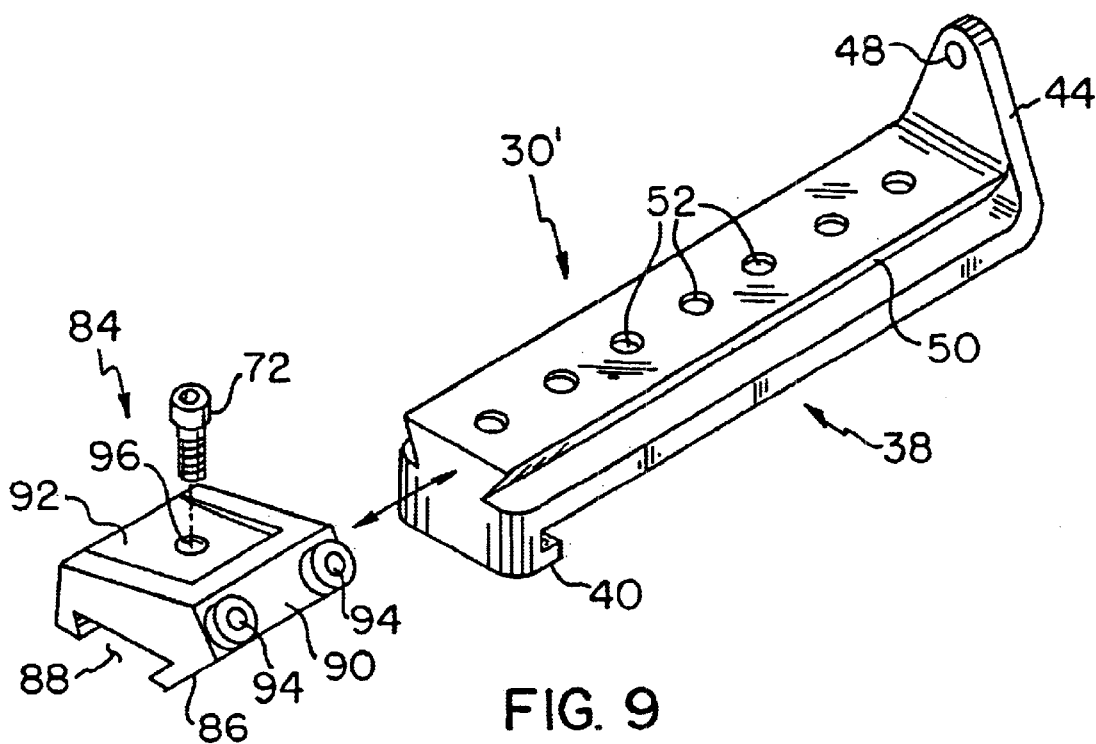
FIG. 9
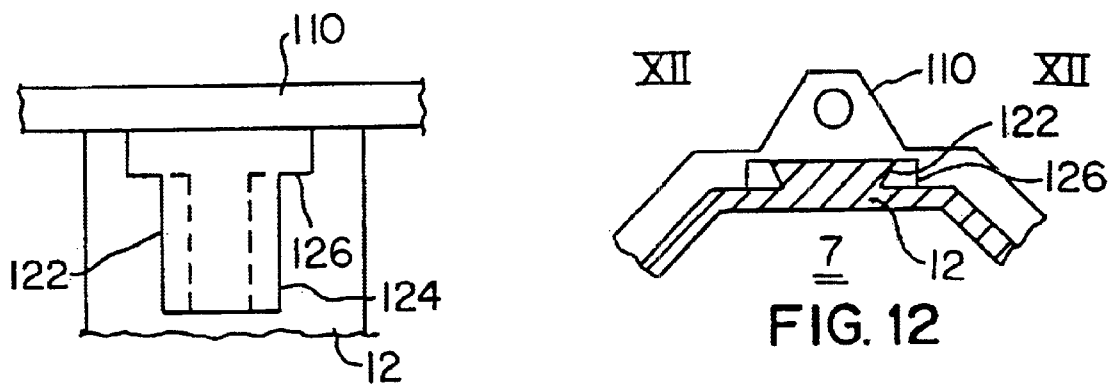
FIG. 10
FIG. 12
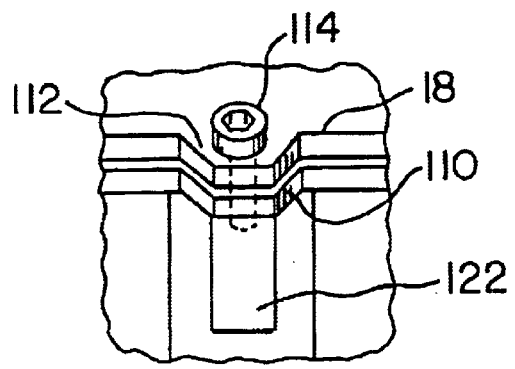
FIG. 11

ENCLOSURE

RELATED APPLICATION

This application is a divisional of U.S. application Ser. No. 09/713,568 entitled "Enclosure" filed Nov. 16, 2000.

BACKGROUND OF THE INVENTION

1. Field of the Invention

The present invention relates to enclosures, more particularly, to an enclosure for mechanical, electrical, electronic components, and associated wiring and circuitry.

2. Prior Art

Enclosures are commonly used to provide a degree of protection to personnel against incidental contact with enclosed equipment and to provide a degree of protection against the surrounding environment for enclosed equipment. Typical enclosures include a box and a door sealed thereto. Frequent access to the components within such enclosures is common for adjustments, maintenance, and inspection of the components. Components within the enclosure may also be changed or replaced as the demand therefor changes. Typically, the components are fastened to a panel inside the enclosure. Panels and components must typically be dismounted from the interior of the enclosure and replaced by other components. In view of the increasing demand for and availability of improved electrical components, components are replaced quite frequently.

Conventional enclosures include interior structures to which components may be mounted with screws and the like. Not all components are equally sized, and adjustments must be made for various configurations of components mounted within an enclosure. Additionally, the time to remove and replace components adds to the cost of operating a system. One solution to this problem is posed in U.S. Pat. No. 5,084,596 which discloses an enclosure having interior corners which accept a mounting structure. However, the type of mounting structures used with that enclosure are limited.

Covers and doors are used to close the open end of the box. A cover is an unhinged portion of an enclosure that covers an opening; a door is a hinged portion of an enclosure that covers an opening. Screw fastener removal to gain access to the interior of the enclosure is cumbersome and adds to the time and expense in using the enclosure. To overcome this problem, certain enclosures include hinges and a quick-release-type fastener. A quick-release-type fastener is useful in many environments, but when access to the components is restricted, such fasteners may not be suitable. U.S. Pat. No. 4,917,421 describes a detachable fastener which is slidably received on the exterior of an enclosure yet allows for locking of the door to the box. This fastener requires highly-specialized contours on the exterior of the box to create surfaces for engaging the fastener.

Hence, a need remains for an enclosure which allows for rapid replacement of components therein.

SUMMARY OF THE INVENTION

This need is met by the enclosure of the present invention which includes a box having a base, an open end, and a box wall extending from the base. A support member having (i) an elongated base with a mounting surface and an exposed surface is releasably attached to the base and side wall, and (ii) a longitudinal rib extending from the exposed surface. Preferably, the corners of the box wall are angular to provide a flat area where a releasable support member can be attached in each of the corners.

A mounting bracket slidably engages the rib of the support member via a groove defined in the underside thereof and includes an engaging member configured to detachably receive a panel or frame on which equipment is mounted. The support member defines a plurality of first apertures, and the mounting bracket defines a second aperture alignable with one of the first apertures to receive a fastener therethrough, thereby fixing a position of the mounting bracket relative to the base.

The engaging member may include a leg defining an aperture for receiving a fastener to secure a panel, frame, or equipment to the engaging member. Alternatively, the engaging member defines a pin receiving opening, the longitudinal axis of the pin receiving opening being parallel to the base of the box and constructed such that a panel or frame having a hinge pin received within said pin receiving opening can rotate relative to the box.

The box wall includes an elongated, raised portion extending from the base and having an end at a position spaced from the open end and including a support member engaging member. In one embodiment, the support member engaging member includes a ledge extending from the raised portion, thereby forming a gap between the ledge and the box wall. The support member further includes a flange received within the gap and releasably engaged with the ledge. Alternatively, the end of the raised portion defines a hole, and the support member includes a pin releasably received in the hole of the raised portion. The base includes a mounting member, and the support member further includes a base leg defining a hole and a fastener extending through the hole in the base leg and into the mounting member to further secure the support member to the box.

The enclosure further includes a door having a planar member and a cover wall configured to abut the box wall when the door is closed over the open end of the box. One side of the door includes an integrally-formed door hinge sleeve. A box hinge sleeve is integrally formed on the open end of the box wall, and the box hinge sleeve and the door hinge sleeve are longitudinally aligned with a hinge pin removably received therein.

The door may be secured to the box via a quick-release-type fastener or by a screw fastener. The quick-release-type fastener of the present invention is attached to the box via a rib extending from an end of the wall towards the base. The rib has a dovetail cross-sectional configuration, wherein a lower portion of the rib is narrower than an upper portion of the rib. The fastener includes a base defining a channel slidably receiving the raised portion and a securing member which engages the door to secure the door to the box.

A complete understanding of the invention will be obtained from the following description when taken in connection with the accompanying drawing figures wherein like reference characters identify like parts throughout.

BRIEF DESCRIPTION OF THE DRAWINGS

FIG. 9 is a component mounting system shown in the corner of the box shown in FIG. 8;

FIG. 10 is a top view of the outside of a corner of the box shown in FIG. 1;

FIG. 11 is a perspective view of a corner of the enclosure with a screw fastener;

FIG. 12 is a partial cross-sectional view of the corner of the box shown in FIG. 1 taken along line XII—XII;

DETAILED DESCRIPTION OF THE PREFERRED EMBODIMENTS

Figure 1:
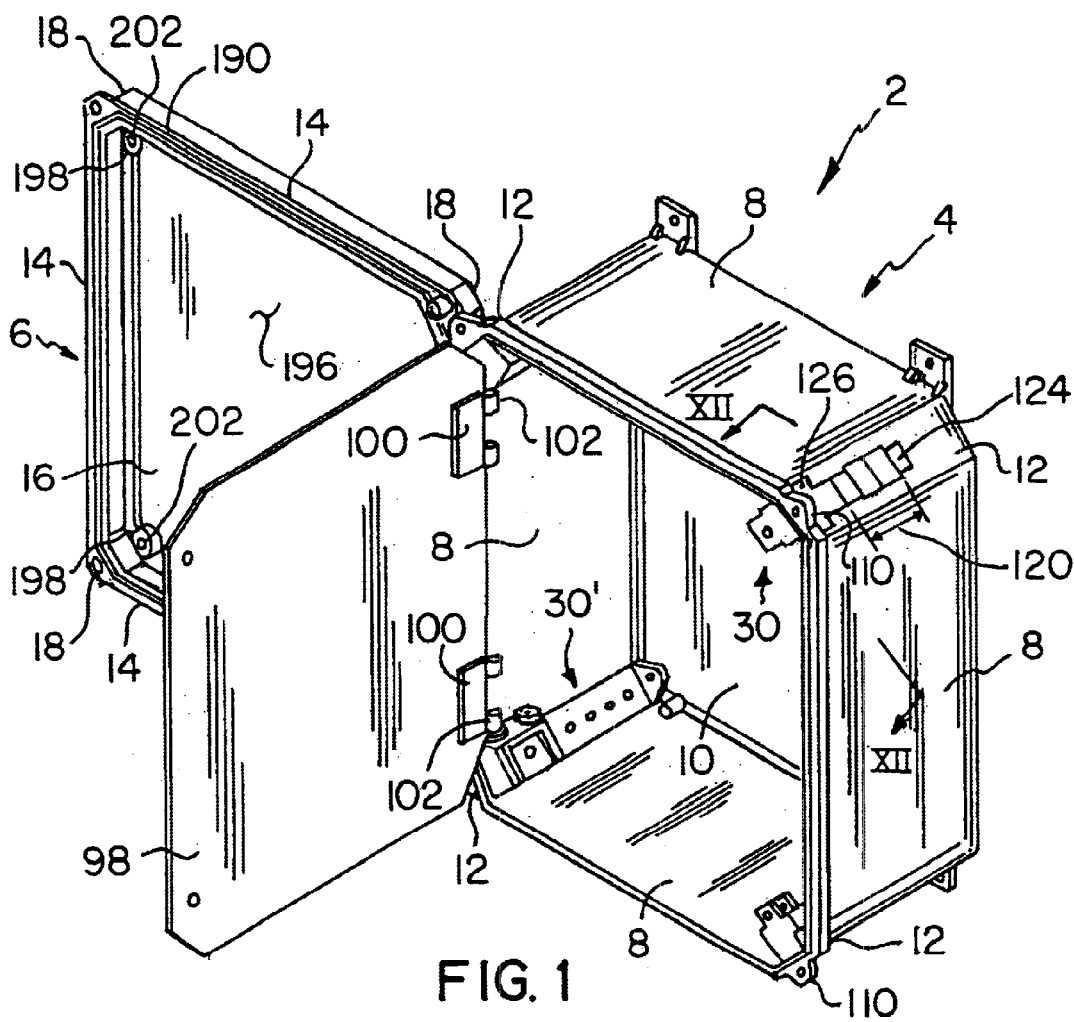
FIG. 1 is a perspective view of the enclosure made in accordance with the present invention including a box and a component mounting system.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative positions and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention includes an enclosure which may be formed from polymers or metals. As shown in FIG. 1, the enclosure 2 includes a box 4 hinged to a door or cover 6 (hereinafter referred to as a door) having a component management system 30 received within the interior 7 of the box 4 and a fastener system 120 fixed on an exterior surface of the enclosure 2 for fastening the door 6 to the box 4. The box 4 preferably has a general rectangular cross-sectional configuration with four walls 8, a base 10, and angular corners 12. The door 6 has a corresponding configuration with four walls 14, a planar portion 16 integrally formed with the walls 14 and angular corners 18.

The component management system 30 is shown in detail in FIGS. 2–5. An interior surface of the angular corner wall 12 of the box 4 includes an elongated, raised portion 32 extending between the base 10 and a position below the open end of the corner wall 12. The raised portion 32 includes a ledge 34 spaced apart from the corner wall 12 defining a gap 36 therebetween and extending generally parallel to the corner wall 12.

A support member 38 is seated on the raised portion 32. One end of the support member 38 includes an L-shaped flange 40 extending from the underside thereof. One leg 42 of the flange 40 is received in the gap 36 between the ledge 34 and the corner wall 12 such that the support member 38 is releasably attached to the raised portion 32. The other end of the support member 38 terminates in a leg 44 extending away from the upper surface of the support member 38. The support member 38 is sized such that the leg 44 seats on the base 10 of the box 4. Preferably, the base 10 of the box 4 includes an internally-threaded mounting member 46. An aperture 48 defined in the leg 44 of the support member 38 is aligned with the mounting member 46 so that a fastener or the like (not shown) may extend through the aperture 48 and thread into the mounting member 46. The upper surface of the support member 38 includes a longitudinally-extending rib 50. Preferably, the rib 50 has a dovetail cross-sectional configuration. Other cross-sectional configurations for the rib include a T-shape or kidney shape. A plurality of locating holes 52 are defined at spaced apart locations along the length of the rib 50.

Figure 3:
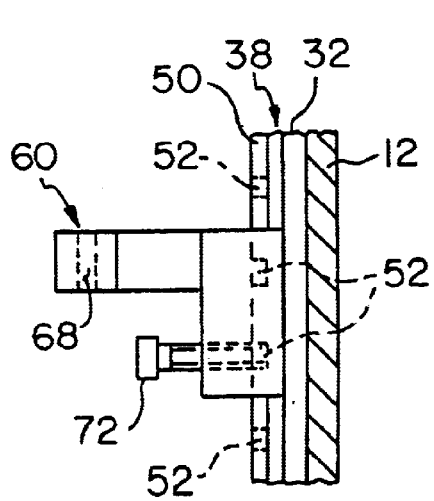
FIG. 3 is a partial cross-sectional view of the corner of the box shown in FIG. 2 taken along line III—III.
Figure 5:
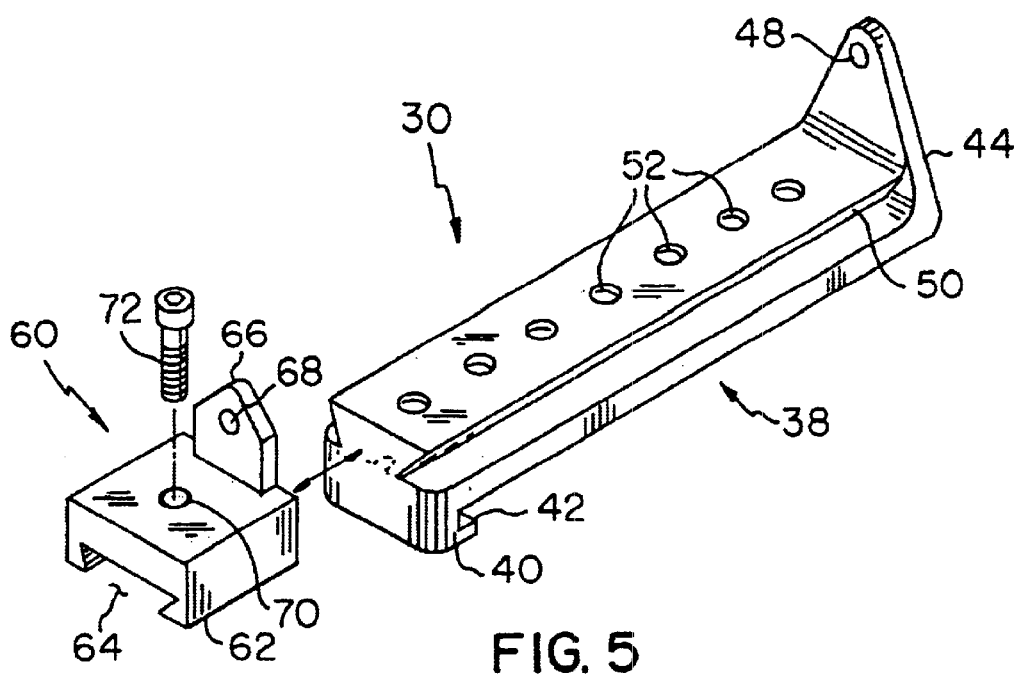
FIG. 5 is an exploded perspective view of the component mounting system shown in one corner of the box shown in FIG. 1 with a support member and a mounting bracket.
Figure 4:
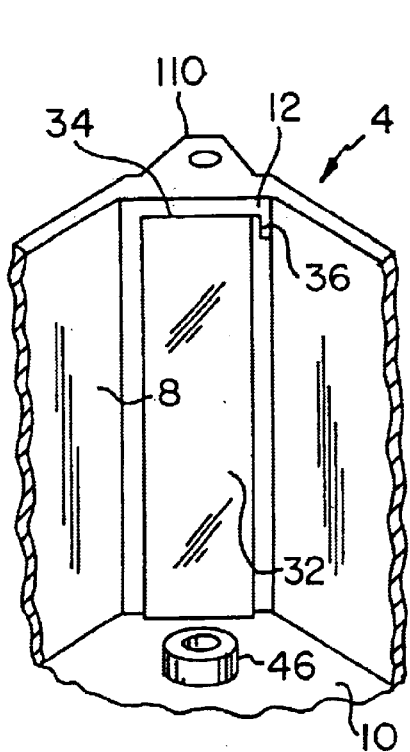
FIG. 4 is a view of the corner of the box shown in FIG. 2 with the component mounting system removed.

A mounting bracket 60 shown in FIGS. 3 and 5 is slidably attached to the rib 50 of the support member 38. The mounting bracket 60 includes a body 62 having an underside defining a channel 64 with a cross-sectional configuration which corresponds with the cross-sectional configuration of the rib 50 of the support member 38. A leg 66 extends from the mounting bracket 60 and defines a hole 68 therethrough to accept a fastener for mounting panels or frames with components to the mounting bracket 60. The body 62 defines a threaded hole 70 therethrough. A fastener 72, such as a screw, is threadable through the locating hole 70 in the mounting bracket 60 into one of the holes 52 in the rib 50 of the support member 38, thereby positioning the mounting bracket 60 at one of a plurality of positions along the length of the support member 38. When the fastener 72 is removed from the rib 50, the mounting bracket 60 may be slid to another position on the support member 38.

Figure 7:
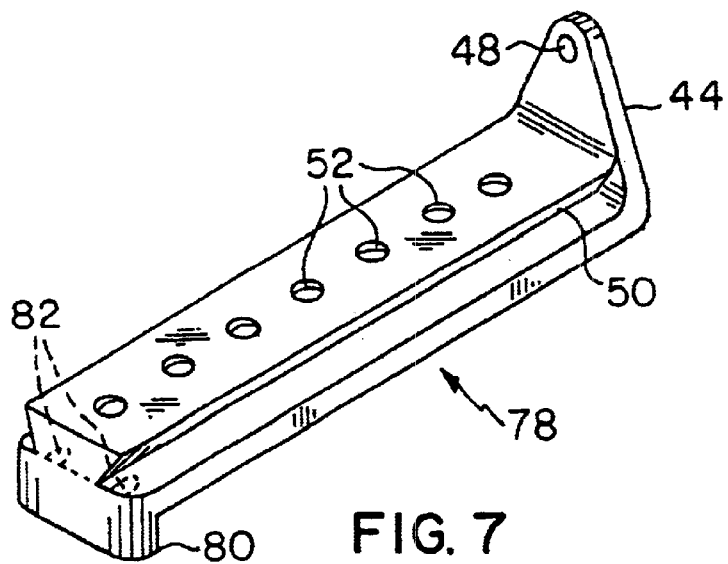
FIG. 7 is a perspective view of a second support member.
Figure 6:
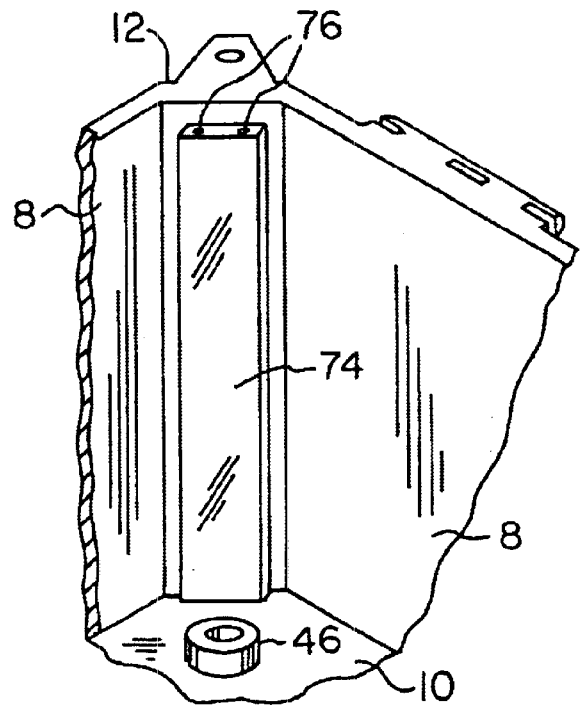
FIG. 6 is an elevation view of another corner of the box shown in FIG. 2 with the component mounting system removed.

In an alternative embodiment shown in FIGS. 6 and 7, the corner 12 of the box 4 defines a raised portion 74 having one end defining one or more pin-receiving holes 76. A support member 78 is seated on the raised portion 74 and includes one or more pins 82 extending from the underside thereof. The pins 82 are received within the holes 76 of the raised portion 74. The upper side of the support member 78 shown in FIG. 7 is otherwise similar to the support member 38 shown in FIG. 5.

Figure 8:
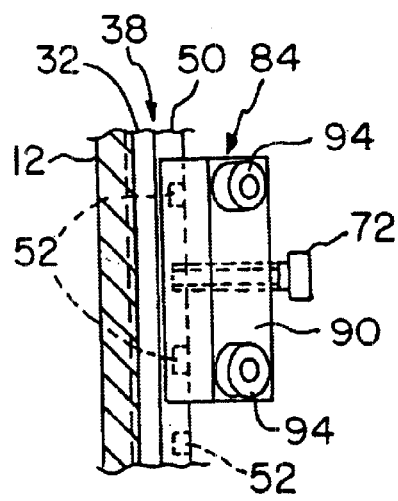
FIG. 8 is a partial cross-sectional view of another corner of the box shown in FIG. 2 taken along line VIII—VIII.
Figure 2:
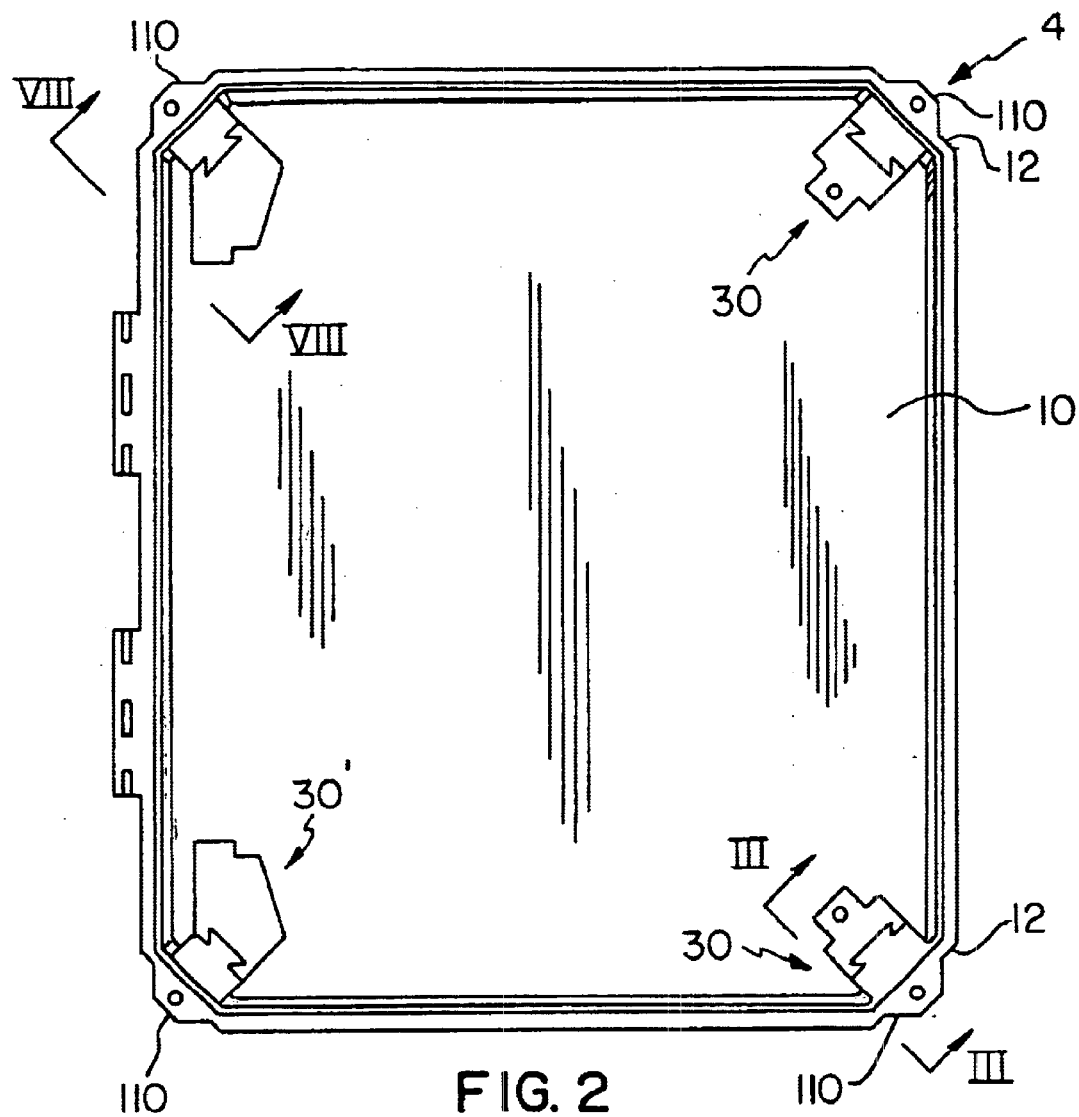
FIG. 2 is an elevation view of the box of the enclosure shown in FIG. 1.

An alternative component management system 30' having a mounting bracket 84 as shown in FIGS. 1, 8, and 9 includes a body 86 having an underside which defines a channel 88 with a cross-sectional configuration which mates with the support member 38 or the support member 78. An upper side of the mounting bracket includes at least two faces 90 and 92 disposed at an angle to each other. Face 90 includes one or more hinge pin receiving members 94 extending therefrom. Face 92 defines a hole 96 for receiving a fastener 72 in a manner similar to the mounting bracket 60 to releasably attach the mounting bracket 84 to support member 38 or support member 78. When adjacent corners 12 of the box 4 include the mounting bracket 84, a hinged member 98 may be mounted thereon as shown FIG. 1. The hinged member 98 includes a pair of hinges 100 with hinge pins 102 received in the hinge pin receiving members 94.

Other structures may be used to releasably attach the support members 38 and 78 to the box in addition to the features of the raised portions 32 and 74. For example, the corner of the box may include a pair of longitudinally-extending ridges and a support member (not shown) having a smooth underside (without the flanges 40 or 80) may be slidably received within the gap between the ridges. An important feature of the enclosure 2 of the present invention is that the mounting brackets 60 and 84 are interchangeable on either of the support members 38 or 78 and are positionable at a variety of depths within the box 4 in order to provide flexibility in the use of the enclosure 2.

As shown in FIGS. 11 and 12, at least one corner 12 of the exterior surface of the box 4 has a boss 110 defining a hole with a threaded insert, and a corresponding corner 18 of the door 6 includes a boss 112 defining a hole. When the door 6 is closed on the box 4, the boss 112 overlies the boss 110 such that the holes therein are aligned. A fastener 114, such as a screw, may be threaded through the holes in the boss 112 to engage the thread in the boss 110 and secure the door 6 to the box 4.

Figure 19:
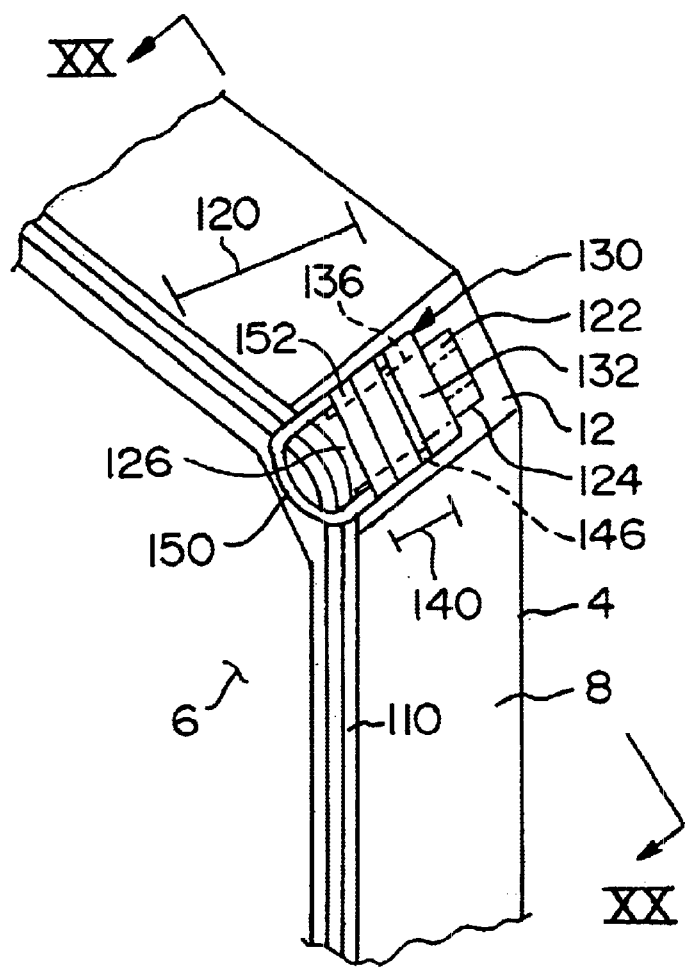
FIG. 19 is a top perspective view of a fastener slidable attached to the box shown in FIG. 1.
Figure 20:
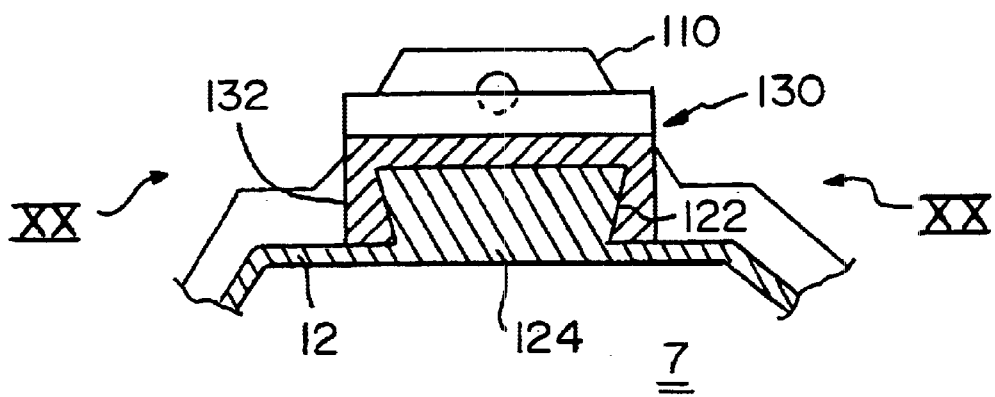
FIG. 20 is a partial cross-sectional view of a corner of the box shown in FIG. 19, taken along line XX—XX.

A quick-release-type of fastening system 120 is shown in FIGS. 1, 13, 19, and 20. As shown in FIGS. 1 and 20, the fastening system 120 is shown as being mounted on a corner 12 but this is not meant to be limited as the fastening system 120 may be mounted to the box 4 intermediate the corners 12. An exterior surface of the corner 12, shown in FIGS. 10, 19, and 20, includes a raised portion 122 having an elongated portion 124 and a terminal portion 126. The elongated portion 124 preferably has a dovetail cross-sectional configuration as shown in FIGS. 10, 12, and 20. The fastener 120 is removably attached to the elongated portion 124 as shown in FIGS. 19 and 20.

Figure 13:
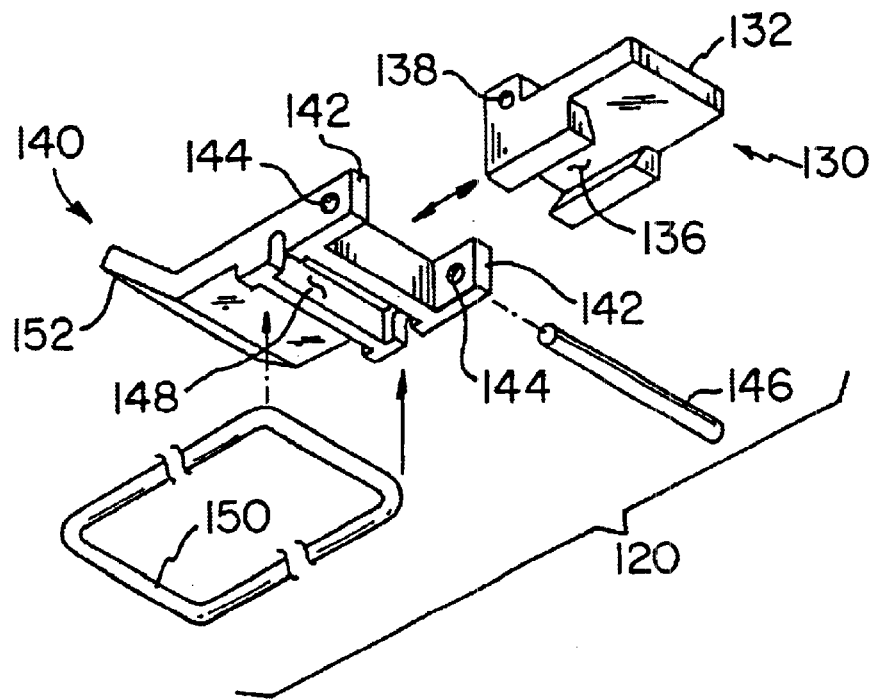
FIG. 13 is an exploded perspective view of the fastener shown on the corner of the box in FIG. 1.

As shown in FIG. 13, the fastener 120 includes a fastener base 130 having a tab 132, a movable toggle portion 140, a pivot pin 146, and a bale 150. The underside of the fastener base defines a channel 136. The cross-sectional configuration of the channel 136 corresponds he cross-sectional configuration of the elongated, raised portion 122 on the box corner. The fastner base 130 defines a pivot pin receiving hole 138. The fastener 120 further includes a movable toggle 140 with one end having a pair of extensions 142, each extension 142 having a pivot pin receiving hole 144 defined therein. A pivot pin 146 extends through the pin receiving holes 144 of the latch 140 and the pivot pin-receiving hole 138 in the fastener base 130. An underside of the movable toggle piece 140 defines a bale receiving channel 148. The bale 150, preferably a continuous loop of wire, is received in the bale receiving 148. The other end of the latch 140 includes an integrally formed angled member 152. In use, as shown in FIGS. 19 and 20, the fastener base 130 is slid onto the raised elongated portion 124 on the corner of the box 4 such that the elongated portion 124 is received in the channel 136, and the end of the tab 132 abuts the terminal portion 126 of the box 4. The bale 150 is moved to a position to catch on the door 6 of the enclosure 2, and the latch 140 is pivoted towards the box 4 into a closed position to secure the door 6 to the box 4.

Figure 14:
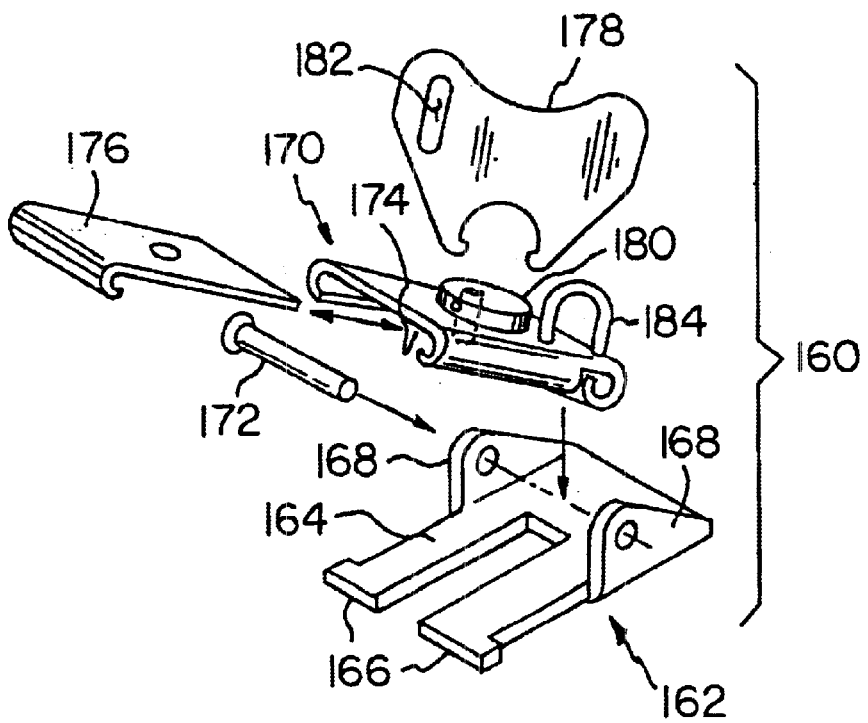
FIG. 14 is an exploded perspective view of another corner fastener.

An alternative fastener 160 is shown in FIG. 14 which is available from Southco Inc. of Concordville, Pa. The fastener 160 includes a base 162 having a U-shaped planar portion 164 and a pair of legs 166 with a pair of side flanges 168 extending therefrom. The legs 166 are slidably received on opposing sides of the elongated, raised portion 124 on the corner 12 of the box 4. A latch 170 is pivotally connected to the base 162 via a pivot pin 172 extending through the side flanges 168 of the base 162. The latch 170 defines a channel 174 on the underside thereof which receives a sliding member 176. A handle 178 is connected to the sliding member 176 via a cam member 180 mounted on the top side of the latch 170 in a conventional manner. Rotation of the handle 178 causes the cam member 180 to rotate and causes the sliding member 176 to slide in or out of the channel 174 to an open or closed position. The end of the sliding member 176 includes a lip which catches on the door 6. The handle 178 is pivotably connected to the cam member 180 such that the handle 178 may be pivoted to lay in a plane parallel to the plane of the sliding member 176. A slot 182 is defined in the handle 178, and a locking loop 184 extends from the upper surface of the latch 170. When the handle 178 is pivoted to lay in a plane parallel to the plane of the sliding member 176, the loop 184 extends through the slot 182 and a conventional lock may be secured thereto.

The enclosure 2 provides for the use of a semi-permanent fastener (a screw threaded through the door 6 and the box 4) or for the use of releasable fasteners with a minimum of structural requirements for the exterior of the enclosure.

Figure 15:
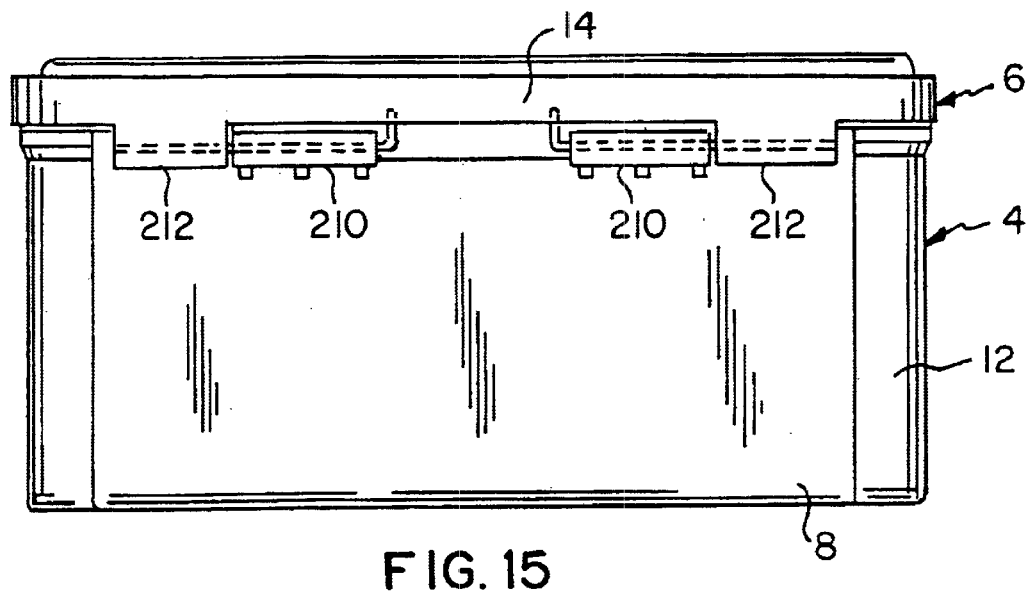
FIG. 15 is a side view of the enclosure of FIG. 1 showing hinges and hinge pins.
Figure 16:
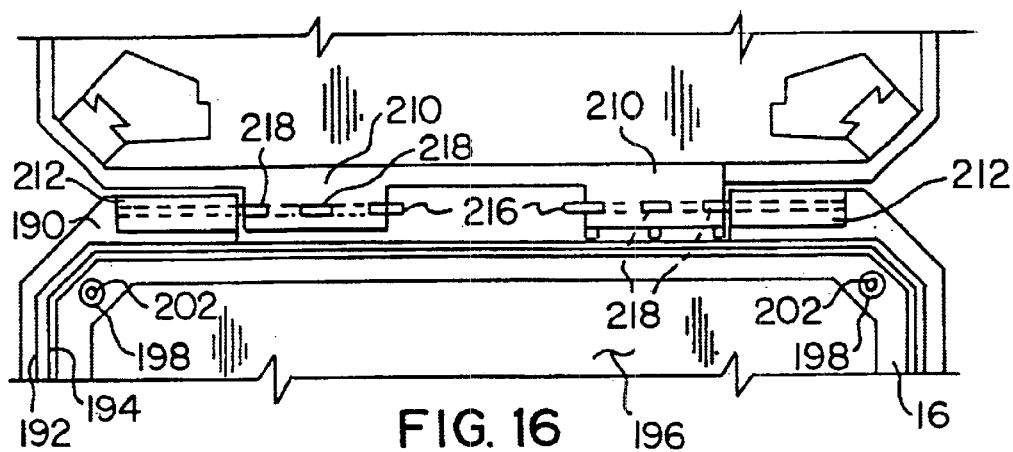
FIG. 16 is a plan view of the hinges of the enclosure shown in FIG. 1.

Referring to FIGS. 1, 15, and 16, the ends of the walls 14 of the door 6 provide a mating surface 190 for abutting against the box 4 when the door 6 is closed over the box 4. The mating surface 190 contains a groove 192 for receiving a sealing member 194. The planar portion 16 of the door 6 defines an opening 196. A plurality of mounting members 198 are fixed to the underside of the planar portion 16. The mounting members 198 each define a hole in which an insert 202 is received. A component, such as a panel or the like (not shown), may be mounted to the inside of the door 6 by extending a screw or the like through the component and into the mounting members 198.

Figure 17:
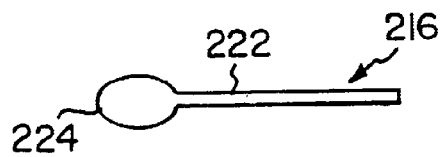
FIG. 17 is a side view of a hinge pin.

As shown in FIGS. 15 and 16, the box 4 includes a single or pair of integrally-formed hinges 210 and the door 6 includes a corresponding pair of integrally-formed hinges 212 longitudinally aligned therewith. Each of the hinges 210 and 212 define a pin receiving channel which receives a hinge pin 216 as shown in FIG. 17. The hinge 210 defines a plurality of openings 218 for molding the hinge integrally in the part. The hinge pin 216 includes an elongated portion 222 and a coined flat area 224. The elongated portion 222 is received within the aligned hinges 210 and 212 and the coined area 224 displaces at one end of the hinge 210 to retain the pin in position. The innermost opening in each pin receiving channel on the box 4 is filled for half the diameter permitting access to the non-coined end of the hinge pin 216. The hinge pins 216 are removed from the channels by using an object such as a small screwdriver to push the hinge pin in the channel and grasping the coined end 224 with pliers to pull the hinge pin 216 out of the hinges 210 and 212. The innermost hinge opening is accessible only when the enclosure is open. Access to this opening is necessary to facilitate easy hinge pin removal.

Figure 18:
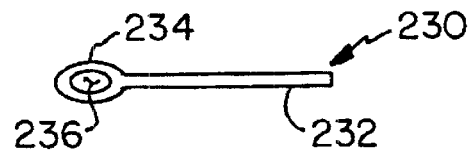
FIG. 18 is a side view of an alternative hinge pin.

An alternative hinge pin 230 is shown in FIG. 18. The hinge pin 230 includes an elongated portion 232 and an eye portion 234 defining an opening 236. The eye portion 234 is received in the channels of the hinges 210 and 212. Removal of the hinge pin 230 is accomplished by placing a tool, such as a screwdriver or the like, into the innermost hinge opening on the box and pushing the pin out. A screwdriver or like tool can be placed in the opening 236 of the eye portion 234 and withdrawing the hinge pin 230.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

I claim:

1. An enclosure for components comprising:
   a box having a base, an open end, four walls extending from the base, and four angular exterior corners extending from said open end of said box toward said base, one of said four angular exterior corners defining a raised portion;
   a door having a planar member configured to abut said four box walls when said door is closed over said open end of said box; and
   a fastener removably attached to said raised portion defined by one of said four angular exterior corners via a channel defined by said fastener, said fastener removably securing said door to said box when said door is closed over said open end of said box.

2. The enclosure of claim 1 wherein said fastener comprises a fastener base, said fastener base having an underside defining a channel having a cross-sectional configuration which corresponds to a cross-sectional configuration defined by said raised portion.

3. The enclosure of claim 2 wherein said raised portion defines a dovetail cross-sectional configuration.

4. The enclosure of claim 2 wherein said fastener comprises:
   a toggle pivotally mounted to said fastener base such that said toggle is moveable between an open position and a closed position; and
   a bale carried by said toggle, said bale being constructed to catch on said door when said toggle is in an open toggle position and secure together said box and said door when said toggle is moved to a closed toggle position.

5. The enclosure of claim 1 wherein said raised portion further defines an elongated portion.

6. An enclosure for components comprising:
   a box having a base, an open end, and four exterior walls extending from the base, one of said four exterior walls defining a raised portion that extends from said open end of said box to said base of said box;
   a door having a planar member configured to abut said four box walls when said door is closed over said open end of said box; and
   a fastener removably attached to said raised portion via a channel defined by said fastener.

* * * * *